(12) United States Patent
Bedingfield

(10) Patent No.: US 9,105,038 B2
(45) Date of Patent: Aug. 11, 2015

(54) METHODS, SYSTEMS, DEVICES AND COMPUTER PROGRAM PRODUCTS FOR PRESENTING INFORMATION RELATED TO CELEBRITIES

(75) Inventor: James Carlton Bedingfield, Lilburn, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 270 days.

(21) Appl. No.: 13/617,378

(22) Filed: Sep. 14, 2012

(65) Prior Publication Data

US 2013/0014277 A1 Jan. 10, 2013

Related U.S. Application Data

(63) Continuation of application No. 12/635,306, filed on Dec. 10, 2009, now Pat. No. 8,479,104, which is a continuation of application No. 11/253,342, filed on Oct. 19, 2005, now Pat. No. 7,676,753, which is a continuation-in-part of application No. 11/031,777, filed on Jan. 7, 2005, now Pat. No. 7,802,205.

(51) Int. Cl.
*G06F 3/048* (2013.01)
*G06Q 30/02* (2012.01)

(52) U.S. Cl.
CPC ..................... *G06Q 30/02* (2013.01)

(58) Field of Classification Search
CPC ............ G06Q 10/1093; G06Q 10/109; G06Q 10/06311; G06Q 30/02; G06Q 30/0201
USPC ........................................... 715/839
See application file for complete search history.

(56) References Cited

U.S. PATENT DOCUMENTS

| | | |
|---|---|---|
| 3,798,603 A | 3/1974 | Wahlberg |
| 6,408,309 B1 | 6/2002 | Agarwal |
| 7,991,637 B1* | 8/2011 | Guiheneuf et al. .......... 705/7.18 |
| 8,010,458 B2 | 8/2011 | Galbreath et al. |
| 8,583,139 B2* | 11/2013 | Jung et al. .................. 455/456.1 |
| 2002/0143861 A1 | 10/2002 | Greene et al. |
| 2002/0196280 A1* | 12/2002 | Bassett et al. ................. 345/751 |
| 2003/0195023 A1 | 10/2003 | Di Cesare |
| 2006/0085751 A1 | 4/2006 | O'Brien et al. |

OTHER PUBLICATIONS http://music.yahoo.com/promo-18684304--smash, 3 sheets; Date unknown but believed to be before Jan. 2005.
http://mf.music.yahoo.com/launch/photos.html, 3 sheets; Date unknown but believed to be before Jan. 2005.
http://music.yaho.com/read/default.asp, 2 sheets; Date unknown but believed to be before Jan. 2005.

* cited by examiner

*Primary Examiner* — Namitha Pillai
(74) *Attorney, Agent, or Firm* — Myers Bigel Sibley & Sajovec

(57) ABSTRACT

The life history of a person or entity can be presented in a graphical representation of a highway. Life events may be represented by simple data strings, or by files such as photographs, dissertations, job offers, and love-letters, among others. For ease in viewing, the information representing the life history is categorized according to type (medical, educational, photographic, etc.) and placed in lanes corresponding to the type of information. The information is also organized by date, being placed between miles corresponding to temporal periods, for instance, years. Other graphical arrangements of stored information are also included.

20 Claims, 6 Drawing Sheets

| Category --> | Finance | Music | Medical | Academic | Sports | Pets | Vacation |
|---|---|---|---|---|---|---|---|
| Primary Source --> | Quicken data | iTunes lists only | Link to HMO database | Hand-entered | Hand-entered | Hand entered | iPhotos |
| General treatment --> | High auth level required for any access | Read-only; authorized user can access content | High auth level required any access | Editable by owner; Read by all | Editable by owner | Editable by owner | Read-only by all |
| Nov 11, 2004 | | | [Special source: Work physical data] | | | | |
| Nov 11, 2004 | | | Triathlon training data read-able by all | | | | |
| Dec 15, 2004 | | | | Source: university transcript; read only; level 2 authorization required to read | | | |
| Jan 5, 2005 | | | | | Source: link to Gwinnett Daily Post article | | |

Figure 5

METHODS, SYSTEMS, DEVICES AND COMPUTER PROGRAM PRODUCTS FOR PRESENTING INFORMATION RELATED TO CELEBRITIES

CROSS-REFERENCE TO RELATED APPLICATIONS

This application is a continuation of U.S. patent application Ser. No. 12/635,306, filed Dec. 10, 2009, now U.S. Pat. No. 8,479,104; which is a continuation of U.S. patent application Ser. No. 11/253,342, filed Oct. 19, 2005, now U.S. Pat. No. 7,676,753; which is a continuation-in-part of U.S. patent application Ser. No. 11/031,777, filed Jan. 7, 2005, now U.S. Pat. No. 7,802,205, the disclosures of which are hereby incorporated herein by reference in their entireties as if set forth fully herein.

TECHNICAL FIELD

The present disclosure is generally related to software for computers and, more particularly, is related to a system and method for the organization and presentation of information in a graphical representation.

BACKGROUND OF THE DISCLOSURE

As days and years go by, people generate exponentially-increasing volumes of personal information, with much of it in electronic form. Such electronic information can include documents, e-mail messages, photos, videos, music collections, web page content, medical records, employment records, educational data, etc. This profusion of information can be organized to some degree and presented; however, it will be of limited use if efficient data management methods are not developed.

Various efforts are underway to assist individuals and organizations in storing and managing data. Many of these are based on search techniques, and they make no specific assumptions about the nature of the data.

Personal data may be located in several locations including on a personal computer, on a cell phone, and in medical records at a doctor's office, among others, and this information needs to be organized effectively. The data may pertain to a person; but, it may also pertain to a company, a school, or some other entity.

Data services are available that store information remotely for an entity for backup purposes. Photo services, such as Ofoto® by Kodak® on the World Wide Web, are available for remotely storing photos. The photos are numbered or dated when they are uploaded. However, there is a need for a more efficient and user-friendly graphical interface for displaying information for easy access.

Thus, a heretofore unaddressed need exists in the industry to address the aforementioned deficiencies and inadequacies.

SUMMARY OF THE DISCLOSURE

Embodiments of the present disclosure provide systems and methods for a chronological path visual representation of storage. Briefly described, in architecture, one embodiment, among others, can be implemented as a system for presenting information comprising: a data storage device for storing information; a display device for displaying a representation of the information; a user interface device for interaction between a user and the display device; and a processor for selectively displaying the representation of the stored information on the display device; wherein the processor displays the information chronologically on a graphically implemented path.

Embodiments of the present disclosure can also be viewed as providing methods for presenting information comprising: saving information with a corresponding time stamp and category; and presenting the information in a visual medium, wherein the visual medium includes, in one example, a highway with a plurality of lanes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a table of data sources for events in an exemplary embodiment of the highway of FIG. 1.

DETAILED DESCRIPTION

Disclosed herein are systems and methods for a graphical chronological path presentation. To facilitate description of the inventive systems, an example system that can be used to implement the systems and methods for a graphical chronological path presentation is discussed with reference to the figures. Although this system is described in detail, it will be appreciated that this system is provided for purposes of illustration only and modifications are feasible without departing from the inventive concept.

Referring now and in more detail to the drawings in which like numerals indicate corresponding parts through the several views, this disclosure is meant to describe a graphical chronological path presentation. It details how the system is configured and how it operates. An exemplary embodiment of the graphical chronological path presentation presents a highway representation of a chronological record of events and information in the life of a person or entity. The record may be categorized by other means, including data type, priority, and originator, among others. Most aspects of the display will be configurable by the user (owner) of the graphical chronological path presentation. Many of the aspects may have maximum values set by the user. A viewer of the highway may also have the ability to configure display aspects up to the maximum levels set by the user.

Figure 1:
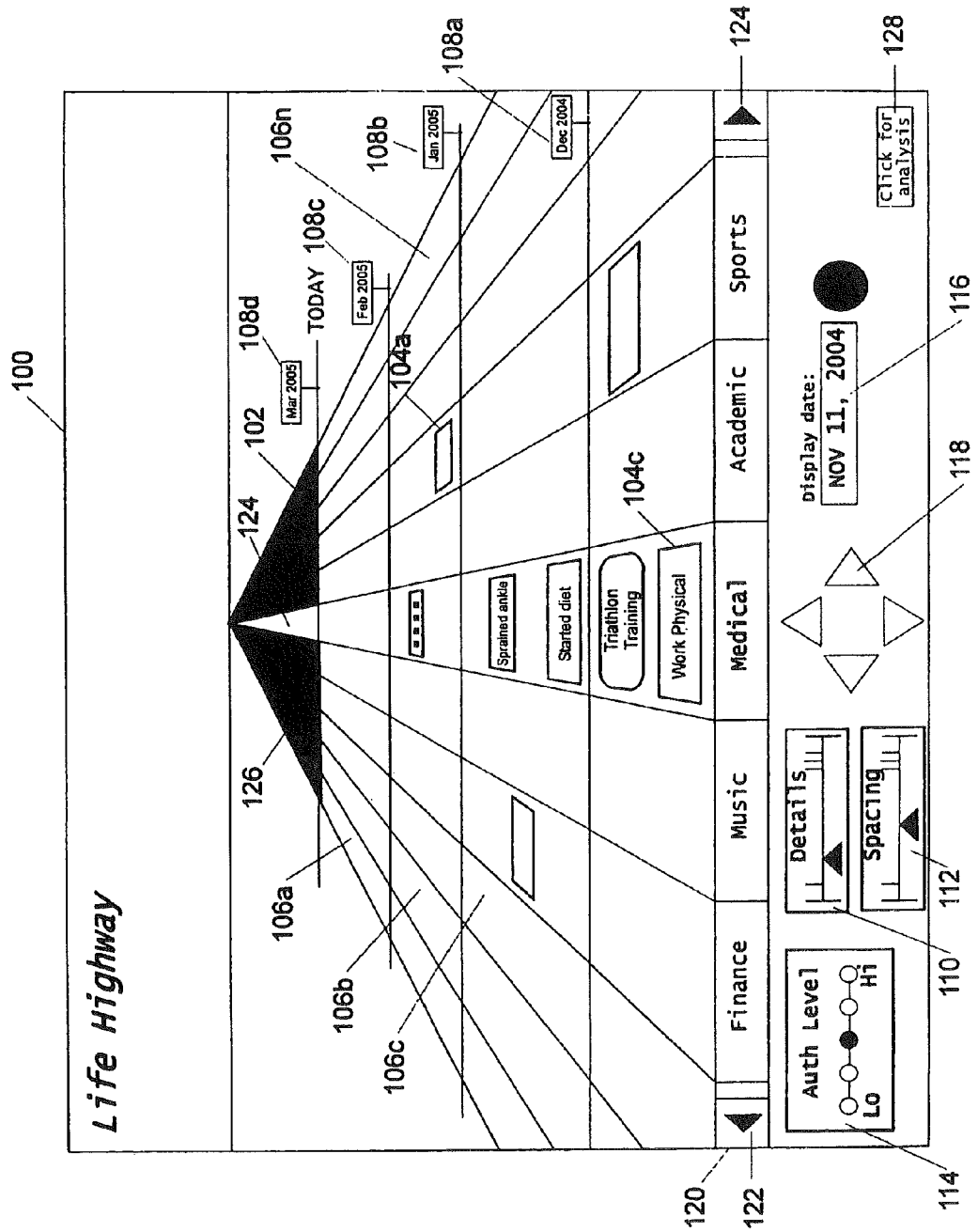
FIG. 1 is a graphical view of an exemplary embodiment of a life history in the graphical chronological path presentation of a highway.

FIG. 1 provides an exemplary embodiment of a display 100 with a graphical interface of a highway 102, where, for example, nearer entries 104c are earlier in time, and farther entries 104a are later in time. (Of course this can be reversed, or factors other than time could be used, such as importance or priority). Multiple lanes can be used to categorize events (a single lane could be used if desired). Lanes may optionally show, for example, a person's age and/or the calendar year as mile markers 108a-d extending across the lanes, with optional displays by month, week, etc.

In an exemplary embodiment, the user reviews the events by "flying over" or "driving down" the highway 102. Control can be provided using directional arrows, 118, or, alternatively, keyboard arrows, keyboard mnemonics, mouse, joystick, trackball, touch screen, etc. A user can also enter text data for searches or for navigation to a specific year or age. The user can pick a lane 106a-106n on the highway 102 to drive in. The lane 124 that the viewer ("driver") is in may be signified by a representation of headlights, and the driver may see details of the events in that lane; but the driver may also see events in other lanes, and can move into other lanes at will. Certain lanes and or events may be concealed from a given viewer or class of viewers. A class of viewers may correspond to an authorization level which will be discussed in detail later.

The category bar 120 holds the label for the category of the events in a lane. If there are more lanes than the settings afford to fit on the screen, the user/viewer can scroll to either side, if available, with arrows 122, 124. The user can set the level of detail for each event with sliding bar 110. The user can set a maximum detail for an event for an authentication level settable in authentication window 114. A viewer can see the authentication level in authentication window 114, but not change it. A viewer may change the detail level up to the maximum level set by the user and may set the spacing to any desired level in spacing window 112. The settings in each window 110, 112, 114 may be performed with sliding bars, radio buttons, or any other method known to one of ordinary skill in the art.

Display date window 116 displays the current date when entering the highway. However the date in display date window 116 may change to the date of the event that a user/viewer hovers over or selects, configurable by the user/viewer.

An alternative embodiment has a feature for developing an indication that some event has been viewed. A trail is kept of the events that are viewed. The indication gets stronger as the event is viewed more often. As time passes, if the event is not viewed, the strength of the indication dissipates. The indication may be used to cache certain events with strong indications for quicker access.

Figure 2:
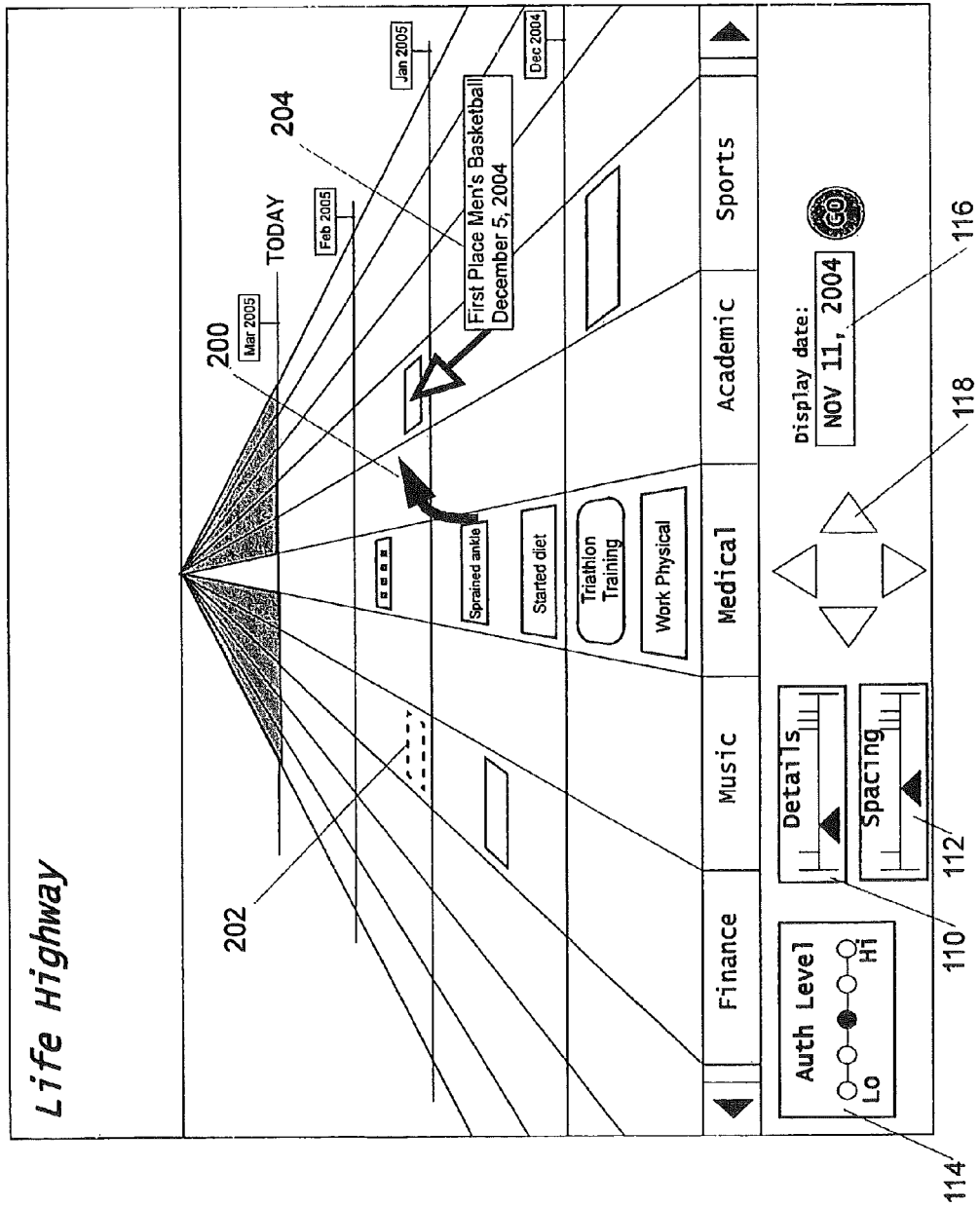
FIG. 2 is a graphical view of an exemplary embodiment of the highway of FIG. 1 with a link to information not on the highway.

As provided in FIG. 2, certain events (e.g., marriage and childbirth for a person, or merger and acquisition for a corporation) may be shown in "entrance" and "exit" ramps which lead to the graphical chronological path presentation of another person or entity by "clicking" or flying/driving on the ramp. Alternatively, these other highways may be accessible with an icon 200 that may be an indication of the type of data on the other highway. In an exemplary embodiment, each event shows up as an object on the highway lane. There may be "event aliases" 202 in other lanes for events which span multiple categories. The object itself may have a shape or text to provide rudimentary information about the type of event.

Figure 3:
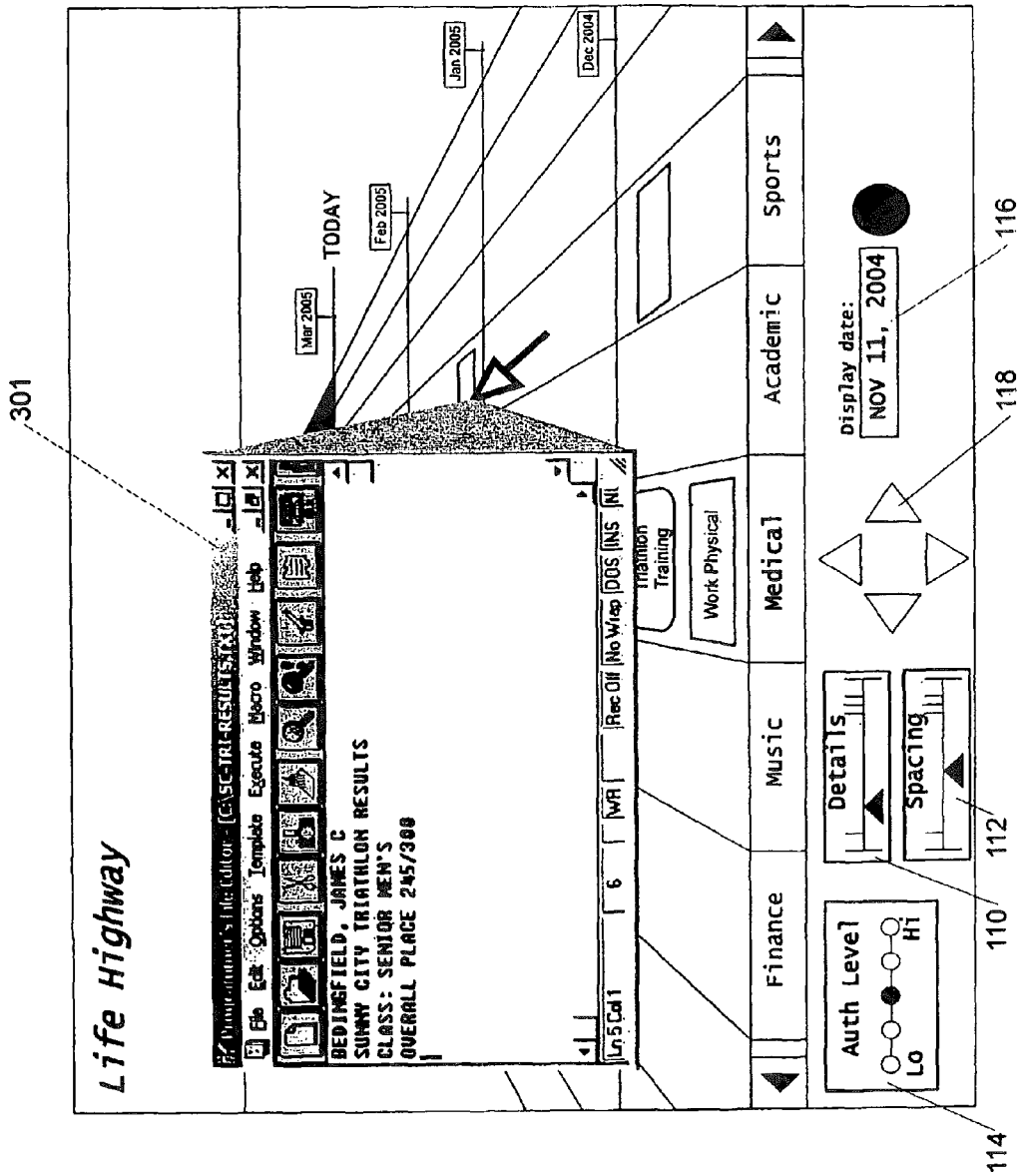
FIG. 3 is a graphical view of an exemplary embodiment of the highway of FIG. 1 with a popup window providing details of an event.

"Hovering over" the event will cause a pop-up window 204 to appear with more detail, and as provided in FIG. 3, double-clicking on the event may open a new window 301 with additional information about the event or item. This may be editable by the user, depending on a level of authorization set by the owner of the information.

The global level of event details may be changed dynamically by the user, within set permissions or authorization levels 206. For example, a low-level display might show every e-mail or song the person ever saved or marked for inclusion, whereas a high-level display would only show major life events. Different users may be authorized to view, edit, append to, or delete individual entries or classes of entries.

In an exemplary embodiment, the user's controls include the ability to set the "driving" speed, e.g., by double-clicking in an area or by some other graphical control as would be appreciated by someone skilled in the art. A preferred embodiment includes a gear shift/accelerator presentation to correspond to the driving representation. The user can set the lane width, scale, vanishing point, etc. to suit the user's browsing needs and he or she can set the spacing between mile markers 208 as earlier described.

Figure 4:
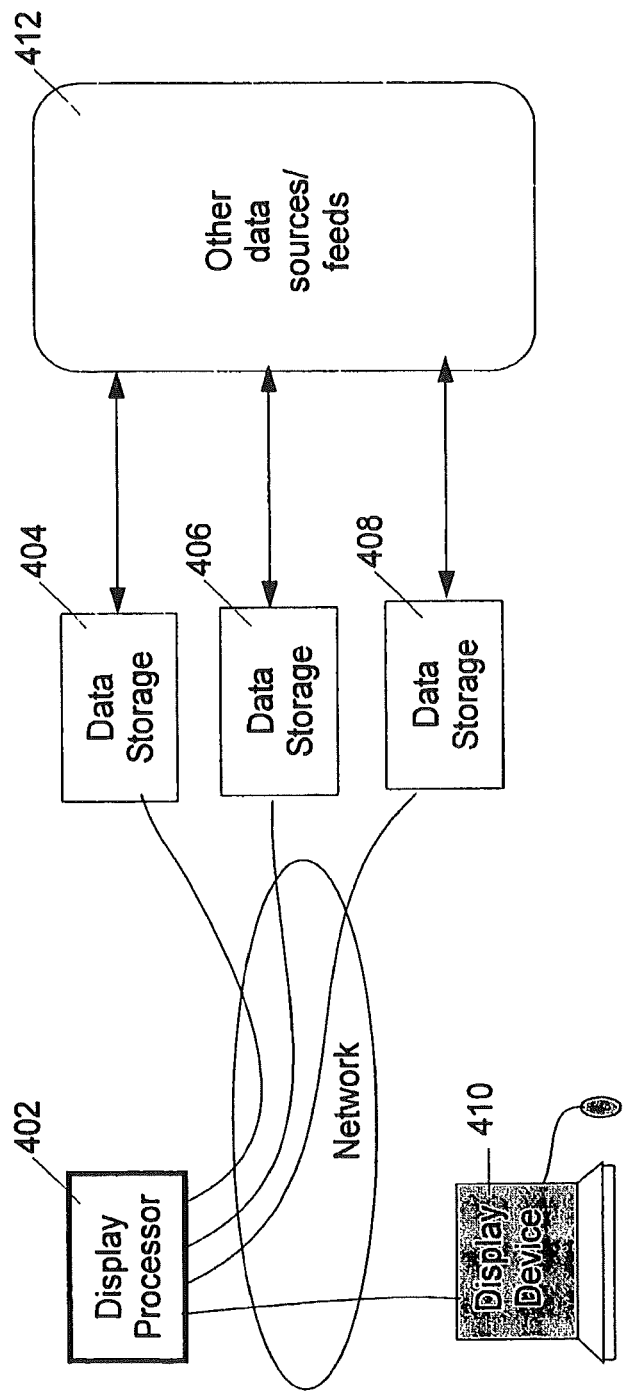
FIG. 4 is a block diagram of an exemplary embodiment of a system for storing and presenting information on the graphical chronological path presentation of FIG. 1.

The graphical chronological path presentation is a presentation of data that may be stored in one or more database mechanisms or in other file types. FIG. 4 shows an exemplary embodiment of one architecture by which a display processor 402 would collect data from multiple data storage sources, 404, 406, 408 collect and format the data into the graphical chronological path presentation format (caching the data for improved response speed in some embodiments), and present it to the display device 410 for interaction with the user. Data storage sources 404, 406, 408 may acquire data from other data sources/feeds 412 as well.

Returning to FIGS. 1-3, the presentation mechanism will track the current date in display date window 116, and the highway portion 126 that extends beyond the current date 108d in FIG. 1 will be visually distinguishable. Real-time data may be displayed. Digital cameras, video cameras, and most files have dates assigned to them. However, if, for instance, the time and/or date is not set, an exemplary embodiment would prompt for setting the date by the user.

The "future" portion of the mechanism may be used for long term goal setting, planning, and filing of personal information related to the future. For example, an event marking the payoff of a mortgage or car loan might be located in the future. Other events include the beginning of retirement eligibility, reminders of an upcoming anniversary, etc. The length of the road can reflect a predicted life span based on lifestyle choices, heredity, and medical information.

"Billboards" beside the highway could be used for usage tips, or for discrete advertising. Billboards may also be used for hyperlinks to other pertinent material. Users can manage and create their own lane designations, optionally selecting from a list of "standards" or by creating new personal designations.

According to an exemplary embodiment, XML-style data markers can be used in the various data storage mechanisms to identify in which lane(s) an event or item should be located. Non-limiting example of lane categories include: medical, physical, educational, academic, artistic, creative favorites, sports, relationships, family, pets, photos, music entertainment, vacations, financial, employment, automotive, citizenship, politics, and cultural.

Organization and Configuration

Referring to FIGS. 1-3, in an exemplary embodiment, the data is stored in categories labeled in bar 120 and each category is set up as a lane in the graphical representation. Each lane categorizes certain types of events. Nearer entries in a lane are earlier in time, and farther entries are later. This perspective could be reversed or other factors could be used for the organization of the events like size or importance, for example. One non-limiting example of a lane is an education lane. Events in the education lane would include, but not be limited to, date of graduation from elementary school, date of graduation from middle school, date of graduation from high school, date of graduation from college, and post graduate work, as non-limiting examples.

Referring to FIGS. 1-3, in an exemplary embodiment when a particular lane is selected, the selected lane 124 is illuminated, perhaps by headlights, and the details of the events in the lane show up as text, while events in non-illuminated lanes are de-emphasized. The details in other lanes would not appear on the screen. When the highway is first accessed, the viewer will start off with a high level view that only shows the major events on the highway. As a user "drives" down the highway, the events for the years that the user is "driving" past appear in the lanes. In the other lanes, although no details are provided, event markers are still visible.

Referring to FIGS. 1-3 an exemplary embodiment implements a gain control 110 such that the viewer can control the level of detail available. The spacing between the mile markers can be controlled with a separate spacing control 112. Notwithstanding the gain setting, the separation distance between mile markers may depend on the number of events located between the markers. If there are no events between two mile markers, the markers can be close together. If there are lots of events the markers spread out.

In an exemplary embodiment a slider control or some other kind of indicator sets the gain, and therefore, the level of detail the viewer wants to see. Also, if a viewer clicks on the mile marker itself rather than the event, the display changes to display the events for that mile marker.

Alternate embodiments include a gearshift and accelerator to change the driving speed. The driving speed as well as the marker spacing may be variable. If there is nothing between markers, the markers could be close together and the "driving speed" could be faster. Another implementation would have the marker distance constant but changes the scale so that ten markers appear on the screen at one time.

In an exemplary embodiment, an owner can change the perspective of the highway 102 as uphill or downhill, from left to right, or from right to left to suit the desires of the owner of the data. Alternatively the owner of the data can allow the viewing style to be set by the viewer. The presentation of the highway may have all the lanes displayed on the screen at once, even though they all are thin; it may have the lanes wide such that the lanes on the edges disappear; but the ones that can be seen are wide enough such that details are viewable. Alternatively, the lanes may be set at some level in between these settings. The choice of setting (of any setting) may be retained by the owner of the data, or it may be granted to the viewer by the owner.

An alternative embodiment may include a graphical representation of city buildings. Instead of driving down a highway, the user flies through a city. The lanes of the highway are replaced with buildings in a city. Alternatively, in a city the lanes are city blocks and the events are buildings.

To create a lane, a user may click in an empty space and a prompt appears to create a new lane. An entry for the lane name appears with a list of common names. There is also an entry location for the user to enter a name not on the list.

An event may be represented by a marker 104 such as a circle or a rectangle. A marker 104 in FIG. 1 is shown as a rectangle, but the event could be represented by other shapes, and different shapes could signify different kinds of events. Shapes, as well as colors, can indicate the importance of an event, as in a major or minor event, for example. Red may signify high importance and green may signify low importance.

An input screen designates an "event" as being in a particular category. In an exemplary embodiment, an event might not necessarily be a document. It might be data. The highway then serves the function of a diary, or a journal. The data is entered into an interface as text data that is stored as the event itself, instead of as an attachment for another file. The shape of the marker for an event containing only data may be in the shape of a sticky note. For example, a user may enter the day that he or she got a dog or bought a new car.

Referring to FIG. 5, an exemplary embodiment of the graphical chronological path presentation is constructed using table 501. Table 501 allows for default data indicators, detailed data management, and accessibility management. Each column in table 501 corresponds to a category, each category being listed in top row 502. As indicated previously, example categories include, but are not limited to, finance, music, medical, academic, sports, pets, vacation, etc. The next row 504 presents the primary data source for each column. Example sources include, but are not limited to, Quicken data, I-tunes lists, links to HMO database, manually entered data, I-photos, etc.

The next row 506 presents the treatment of the data pertaining to its authorization level. The levels include, but are not limited to, high authorization level required for access; read only—authorized user can access content; editable by owner—readable by all; etc. The subsequent rows 508 contain the dates and sources for the event data.

An exemplary embodiment employs XML tags to categorize the events. Data is stored in a wide variety of methods and the structure of the database must be understood for correct implementation and to be able to read the data in a meaningful manner. XML provides a mechanism to impose constraints on the storage layout and logical structure. XML (Extensible Markup Language) describes a class of objects called XML documents. XML documents are made up of storage units called entities, which contain either parsed or unparsed data. Parsed data is made up of characters some of which form character data, and some of which form markup. Markup encodes a description of the document's storage layout and logical structure.

If the event on the highway is provided as an XML document, other documents can access the data without having to know the structure of the database. XML tags in a document make it possible to display information to any program that can process XML. It could be formatted data or plain text.

Referring to FIGS. 1-3, at some point, settable by the user, or according to the present date, the road may become a different shape or color 126 because it represents the future. Events in the future include goals or plans like a calendar. The goals or plans can be categorized whether they are medical, educational, personal, etc. For instance, a user could enter a weight loss goal for a date in the future. One embodiment would present a prompt with a reminder that today the user is supposed to weigh 200 pounds. The prompt could also include an option for deleting, saving, modifying, or moving the goal.

Referring to FIG. 2, in an exemplary embodiment, a marker 200 is available to indicate a path to another highway, or to some other location off of the highway. One nonlimiting example includes a link in the education or academic lane. The event could be "Graduated from Georgia Tech" and there would be a marker with a link to the website for Georgia Tech.

For information about the user at Georgia Tech, a viewer would click on the marker for the event corresponding to grades at Georgia Tech.

An alternative embodiment may have a marker for a link to a second highway for another person or entity. The link to the second highway may be represented by an exit ramp or some other marker. For the second highway, all the lanes in the highway would change for that person or entity.

Authorization

Referring to FIGS. 1-3, in an exemplary embodiment, a user has been inputting or linking information into his graphical chronological path presentation, but he or she does not want all viewers to view all the data. The user may only want a viewer to see that an event is a "medical record" without any detail as to what the medical record is. A level of authorization may be selected in authorization window 114 to limit access to information only to those authorized at a certain level. The user can define levels of access as the data is input into the system. The level of authorization may be defined or changed at any time.

As a non-limiting example, the user can set the medical records with standard authorization, such that the category of medical records are accessible only to those given medical authorization codes. The viewer would have to be a doctor or medical person to be able to view the events. All medical records may have standard medical authorization.

An exemplary embodiment has different levels of authorization. Every event in a row can have one level of authorization, or each event can have its own individual authorization level. As a non-limiting example, one level of authorization is minimum authorization. A viewer with minimum authorization may not see any events on the medical lane, for instance. The next level of authorization allows a viewer to see that there is an event but not any details for the event. In the next level of authorization, a viewer can actually see what the event is either by the shape of the event or by floating the mouse pointer over it. When the pointer floats over the event, a box may appear with an event description. In the medical lane, non-limiting examples of the details include a college physical, wisdom teeth pulled, etc. In the next level of authorization, the viewer is able to click on the event, and view all of the details for the event. The last level of authorization allows the viewer to change the information in the event.

An example of authorization levels as known in the art is that of the Unix operating system. Unix has three levels of authorization: a global level, a group level, and a personal level. This same level philosophy can be extended for the graphical chronological path presentation.

One of ordinary skill in the art would understand that the levels of authorization are configurable and manageable such that other authorization schemes are included in this disclosure, though not discussed.

Figure 6:
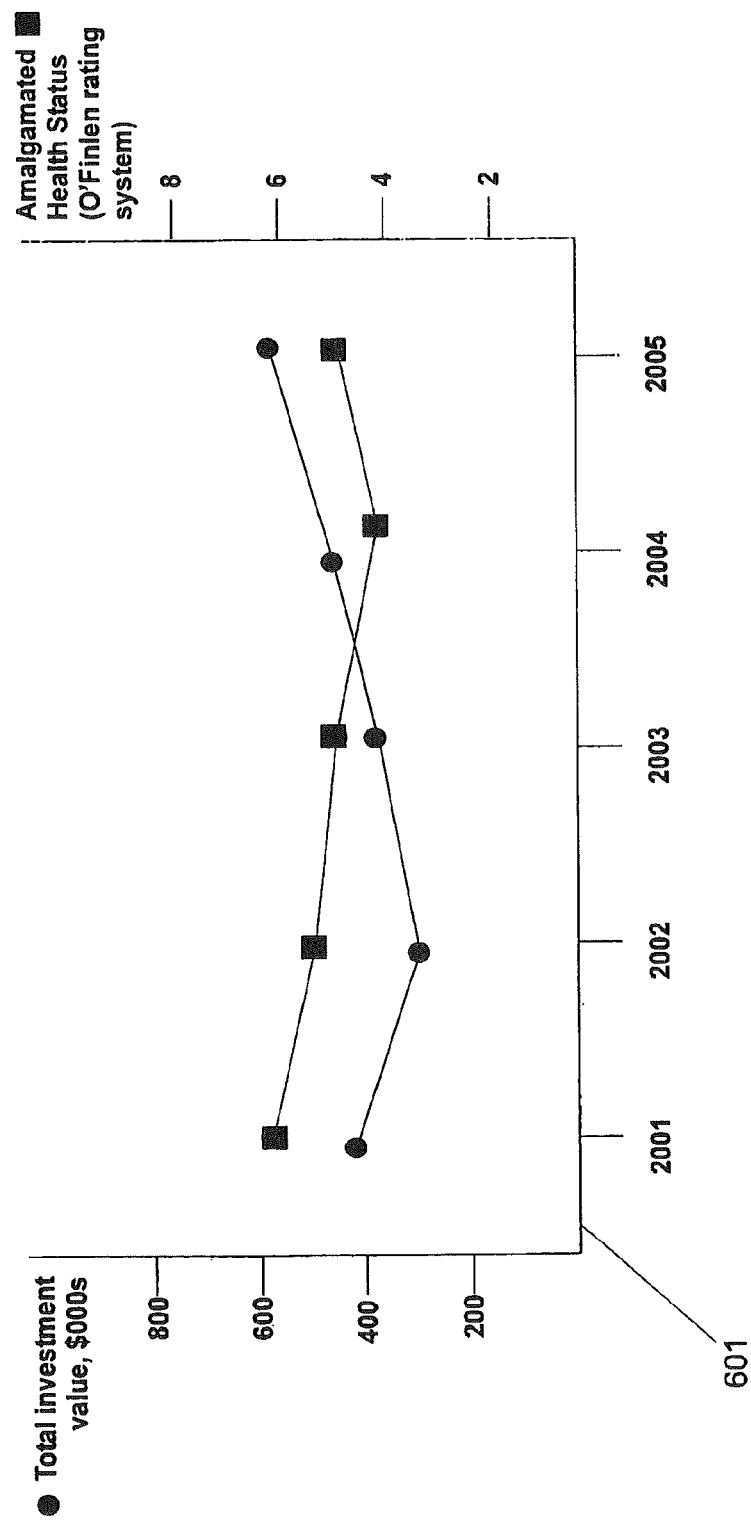
FIG. 6 is a correlation graph of data chosen from an exemplary embodiment of the highway of FIG. 1.

Referring to FIGS. 1 and 6, FIG. 1 has an analysis button 128 that can be used to compare data from different sources. After clicking on analysis button 128, the user/viewer may select data from different sources. Referring to FIG. 6, a display 601 is then generated presenting the comparison. In the non-limiting example of FIG. 6, the investment in fitness programs and equipment is compared to a subjective health status rating system. Of course, access to this feature would be configurable by the user.

An exemplary embodiment includes a server for data storage as provided in FIG. 4. A user can create data and/or files and store them on the server, or transfer data and files from some other data storage locations to the server. Alternatively, the user could store data in some other reputable data storage device and make it accessible through the highway interface via a link.

Embodiments of the present invention can be implemented in hardware, software, firmware, or a combination thereof. In the preferred embodiment(s), the life history graphical presentation is implemented in software or firmware that is stored in a memory and that is executed by a suitable instruction execution system. If implemented in hardware, as in an alternative embodiment, the life history graphical presentation can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software and/or firmware in memory may include one or more separate programs, each of which comprises an ordered listing of executable instructions for implementing logical functions. The software in the memory can include a suitable operating system (O/S). The operating system essentially controls the execution of other computer programs, and provides scheduling, input-output control, file and data management, memory management, and communication control and related services.

The programs include a source program, executable program (object code), script, or any other entity comprising a set of instructions to be performed. When the programs are implemented as a source program, the programs need to be translated via a compiler, assembler, interpreter, or the like, which may or may not be included within the memory, so as to operate properly in connection with the O/S. Furthermore, the programs can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The life history program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, or store the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer implemented method of presenting information related to celebrities, the method comprising:
    storing event information with a corresponding time stamp, the event information including personal data associated with a plurality of celebrities including personal favorites data of the plurality of celebrities;
    associating the event information with an object;
    visually presenting the object in a visual representation of events in a life of a person, the events being graphically depicted in chronological order as objects along a timeline,
        wherein the event information is displayed in response to receiving a selection of the object associated with the events in the life of a person;
        wherein the visual representation includes a plurality of partitions, wherein the plurality of partitions can be navigated by a user; and
        wherein the object associated with the event information is presented corresponding to the timeline representation of a chronological record of the life of a person; and
    providing access to the personal data of at least one of the plurality of celebrities to a sponsor, the personal data including purchase data of products and services to allow a sponsor of the at least one of the plurality of celebrities to monitor compliance with an endorsement contract to monitor the products or services that a respective celebrity uses based on the stored event information.

2. The method of claim 1, further comprising selecting one of the plurality of partitions for display from a listing of partitions representative of the timeline.

3. The method of claim 2, further comprising representing a subset of the plurality of partitions.

4. The method of claim 1:
    wherein the events in the life of a person are associated with a plurality of categories; and
    wherein each of the plurality of categories has an associated authorization level.

5. The method of claim 4, wherein the authorization level is user selectable and wherein access to the plurality of categories is only provided to users having the associated authorization level.

6. The method of claim 1, further comprising visually presenting an indication that one of the plurality of events has been viewed.

7. The method of claim 6, wherein the indication gets stronger as the one of the plurality of events is viewed and wherein the indication dissipates as time passes and the one of the plurality of events is not viewed.

8. A system to present information related to celebrities, the system comprising:
    a data storage device to store event information, the event information including personal data associated with a plurality of celebrities including personal favorites data of the plurality of celebrities;
    a display device to display a visual representation of events in the life of a person;
    a user interface device to interact between a user and the display device;
    a processor to selectively display the visual representation of the events in the life of a person on the display device, the events being graphically depicted in chronological order as objects along a timeline,
        wherein the event information is displayed responsive to receiving a selection of an object associated with the events in the life of a person;
        wherein the visual representation includes a plurality of partitions, wherein the plurality of partitions can be navigated by a user; and
        wherein the object associated with the events in the life of a person is presented with a partition corresponding to the timeline representation of a chronological record of the life of a person; and
    provide access to the personal data of at least one of the plurality of celebrities to a sponsor, the personal data including purchase data of products and services to allow a sponsor of the at least one of the plurality of celebrities to monitor compliance with an endorsement contract to monitor the products or services that a respective celebrity uses based on the stored event information.

9. The system of claim 8, wherein the processor is configured to display one of the plurality of partitions responsive to selecting one of the plurality of partitions from a listing of partitions representative of the timeline.

10. The system of claim 8:
    wherein the events in the life of a person are associated with a plurality of categories; and
    wherein each of the plurality of categories has an associated authorization level.

11. The system of claim 10, wherein the authorization level is user selectable and wherein access to the plurality of categories is only provided to users having the associated authorization level.

12. The system of claim 8, wherein the processor is further configured to visually present an indication that one of the plurality of events has been viewed.

13. The system of claim 12, wherein the indication gets stronger as the one of the plurality of events is viewed and wherein the indication dissipates as time passes and the one of the plurality of events is not viewed.

14. A non-transitory computer program product for presenting information related to celebrities, the computer program product comprising:
    a tangible, computer readable storage medium having computer readable program code embodied in said medium, the computer readable program code comprising:
    computer readable program code to store event information with a corresponding time stamp, the event information including personal data associated with a plurality of celebrities including personal favorites data of the plurality of celebrities;
    computer readable program code to associate the event information with an object;
    computer readable program code to visually present the object in a visual representation of events in a life of a person, the events being graphically depicted in chronological order as objects along a timeline,
        wherein the event information is displayed in response to receiving a selection of the object associated with the events in the life of a person;

wherein the visual representation includes a plurality of partitions, wherein the plurality of partitions can be navigated by a user; and wherein the object associated with the event information is presented corresponding to the timeline representation of a chronological record of the life of a person; and computer readable program code to provide access to the personal data of at least one of the plurality of celebrities to a sponsor, the personal data including purchase data of products and services to allow a sponsor of the at least one of the plurality of celebrities to monitor compliance with an endorsement contract to monitor the products or services that a respective celebrity uses based on the stored event information.

15. The computer program product of claim 14, further comprising computer readable program code to select one of the plurality of partitions for display from a listing of partitions representative of the timeline.

16. The computer program product of claim 15, further comprising computer readable program code to represent a subset of the plurality of partitions.

17. The computer program product of claim 14:

wherein the events in the life of a person are associated with a plurality of categories; and wherein each of the plurality of categories has an associated authorization level.

18. The computer program product of claim 17, wherein the authorization level is user selectable and wherein access to the plurality of categories is only provided to users having the associated authorization level.

19. The computer program product of claim 14, further comprising computer readable program code to visually present an indication that one of the plurality of events has been viewed.

20. The computer program product of claim 19, wherein the indication gets stronger as the one of the plurality of events is viewed and wherein the indication dissipates when as time passes and the one of the plurality of events is not viewed.

* * * * *